United States Patent [19]
Hendretti

[11] Patent Number: 4,832,845
[45] Date of Patent: May 23, 1989

[54] PERMANENT COFFEE FILTER

[76] Inventor: Thomas Hendretti, 2900 N.E. 14th St., Causeway #601, Pompano Beach, Fla. 33062

[21] Appl. No.: 133,437

[22] Filed: Dec. 15, 1987

[51] Int. Cl.⁴ .............................................. B01D 23/28
[52] U.S. Cl. .................................... 210/470; 210/455; 210/474; 210/478; 210/447.3; 99/306; 99/323
[58] Field of Search ............... 210/470, 471, 474, 477, 210/481, 482, 455, 497.3; 99/306, 323

[56] References Cited
U.S. PATENT DOCUMENTS

| | | | |
|---|---|---|---|
| 3,935,112 | 1/1976 | Greutert | 210/482 X |
| 4,080,299 | 3/1978 | Bartolome | 210/481 X |
| 4,231,876 | 11/1980 | Zimmermann et al. | 210/481 X |
| 4,255,265 | 3/1981 | Greutert | 210/474 |
| 4,728,425 | 3/1988 | Sandvig | 210/482 X |

*Primary Examiner*—Tom Wyse
*Attorney, Agent, or Firm*—Lewis A. Thaxton

[57] ABSTRACT

The present invention relates to a reusable or permanent filter assembly useful in positioning and retaining the ground roast of coffee or tea in a hot water beverage maker. The plastic filter assembly consists of a separable outer container and an inner/perforated filtering element. The filtering element contains a plurality of equidistant holes or perforations that permits the rapid drip of a preferred beverage from the filter assembly.

1 Claim, 3 Drawing Sheets

PERMANENT COFFEE FILTER

BACKGROUND OF THE INVENTION

1. Field of the Invention

This invention is generally directed to an apparatus used to brew beverages such as coffee or tea. The invention particularly relates to a reusable or permanent filter element and container basket for supporting coffee or tea ground roast. The assembly consists of a filtering member for receiving ground roast coffee or tea, over which hot water is poured. The filter contains sieve-like perforations throughout, while the basket is provided with a single but axial and centrally situated orifice.

2. Prior Art

The invention is directed to the preparation of filtered coffee or. tea. Many coffeemakers achieve such filtering preparations by means of using disposable filter paper, which is a "one time shot." The disadvantage of these known filter devices is the degree to which the user must repeatedly replace such filters with the concomitant expense inherent thereto.

Reusable coffee filters are well known in the art. Such filters, in the form of a planar-sieve, are generally fixed at the bottom of a container, coffee roast is placed on top of the filter unit and hot water is received on top of the roast. The prior art filters are usually made of metal, which permits an extremely slow rate of coffee flow. Additionally, metal filters have been characteristically difficult to clean of coffee oils, acids and sediments.

SUMMARY OF THE INVENTION

It is an object of the invention to provide a reusable and permanent coffee or tea filter which is easy to clean and with which a perfect beverage is obtained.

Another object of this invention consists in the production of a filter in which the filtering member exhibits a faster filtering rate than the metal filters heretofore.

In accordance with the invention, the filter assembly consists of a container basket and a filtering element. The container has the general configuration of a cup with its bottom end provided with an axially and centrally located orifice, which permits the filtered beverage to drip into a container, i.e. a carafe. The container is provided with a molded rim, on its top end, to which a handle is contiguously formed.

The filtering element consists of a bottom and laterally disposed plurality of equidistant holes or perforations. The filter element is further provided, at its top end, with a corresponding rectangular rim, having laterally opposed handles affixed thereto.

The container basket and filtering element are made of a thermosetting plastic material and requires no new technology.

All of the characteristics and advantages of the invention will be better understood on the basis of the following description as such is read in conjunction with the accompanying drawings.

DETAILED DESCRIPTION OF THE EMBODIMENT

Figure 1:
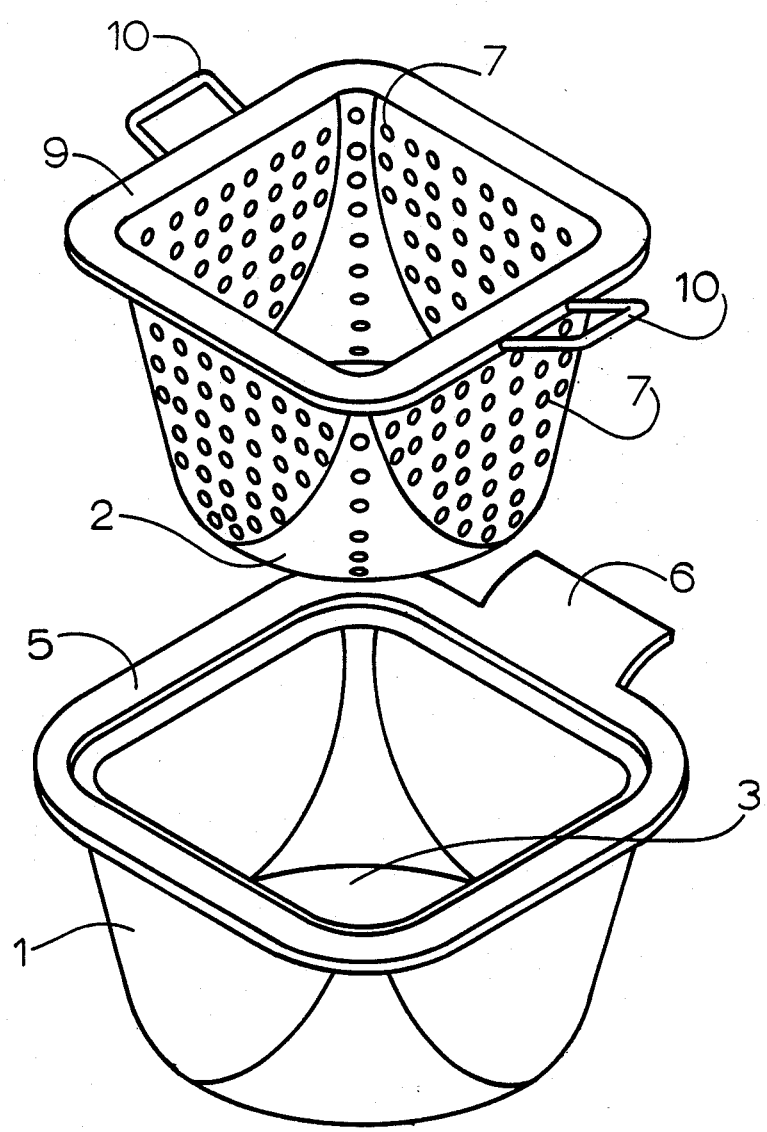
FIG. 1 is a perspective view of the filter assembly designed in accordance with this invention.

The filter assembly consists of a container 1 and a filtering element 2, as illustrated in FIG. 1.

The container 1 has the donfiguration of a cup or basket, the bottom 3 being equipped with an axially and centrally situated hole 4 which permits the filtered coffee or tea to drip out of container 1. At its top end, container 1 is provided with a rectangularly contoured rim 5 with a contiguously formed handle 6, which is used to install or remove the filter assembly from the beverage maker.

Figure 2:
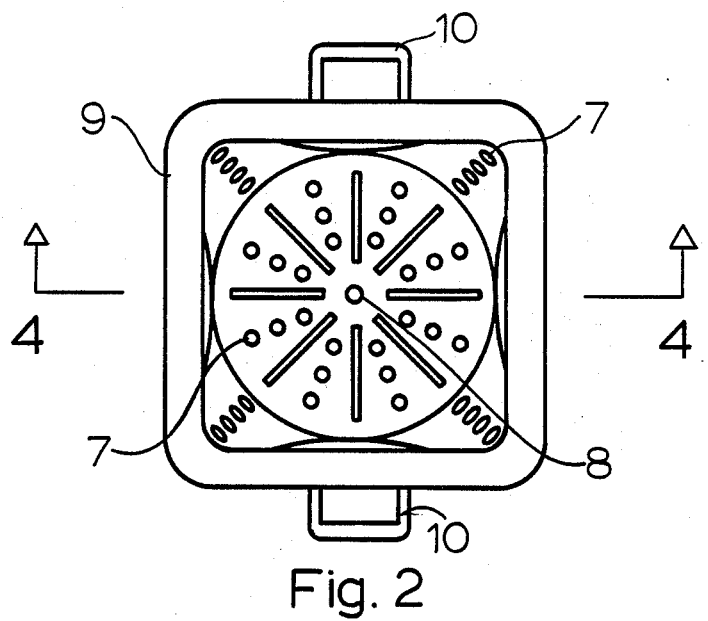
FIG. 2 is a top plan view of a beverage filter embodying the present invention.
Figure 3:
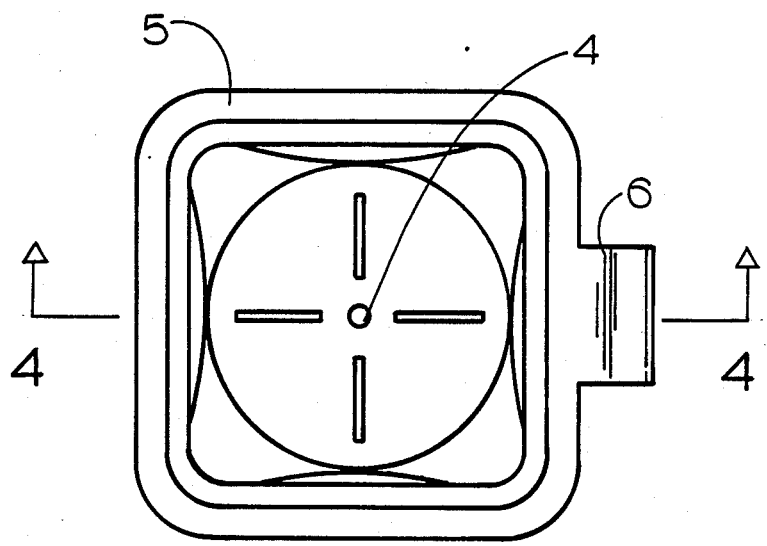
FIG. 3 is a top plan view of a beverage container embodying the present invention.
Figure 4:
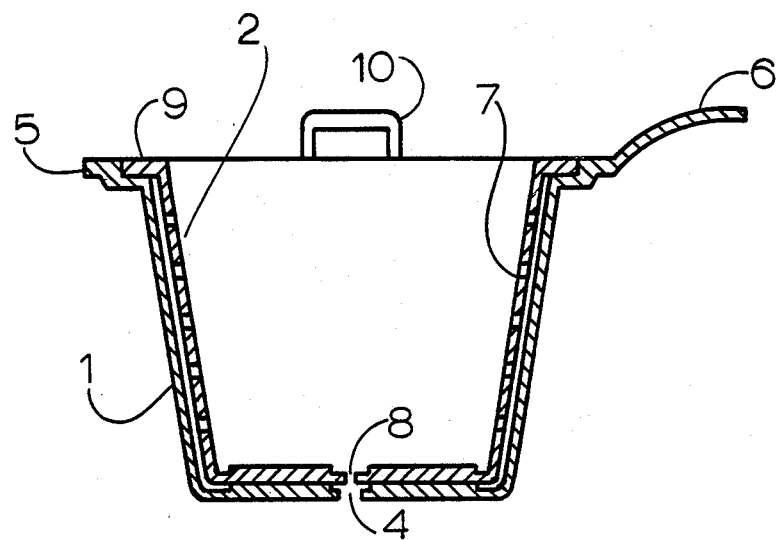
FIG. 4 is a vertical sectional view of the filter assembly of FIGS. 2 and 3, as taken along line 4-4.

The filtering element 2 is a slightly smaller basket that removably and matingly corresponds with container 1. The filtering element 2 consists of both bottom and laterally equidistant perforations 7, as can be seen in FIGS. 1, 2 and 4. A somewhat smaller, but corresponding orifice 8 is axially and centrally disposed at the bottom end of filter element 2, and aligns itself with orifice 4. At its top end, filter element 2 is equipped with a rectangularly contoured lip 9, which rests on container rim 5. Filtering element 2 is further provided with laterally opposed handles 10, used to conveniently install or remove ground roast from container 1.

In compliance with the statues so governing, the invention has been set forth in language more or less specific in accounting for structural and functional features. However, it is understood that the invention is not limited to the specific features shown but that the means and construction herein disclosed comprise a preferred manner of executing the invention, while numerous modifications of the disclosed embodiment will undoubtedly occur to those of skill in the art and the spirit and scope of the invention is to be limited solely in light of the appended claims.

I claim:

1. A reusable filter assembly for drip-type beverage makers comprising a container and a filtering member, said container comprising a cup-shaped appearance having an axially and centrally disposed orifice at its bottom end and a rectangularly contoured rim having a contiguously formed handle at its top end, a filtering element comprising a corresponding and alignable orifice at its bottom end, said filtering element having bottom and laterally equidistant perforations throughout, and a rectangularly contoured lip having laterally opposed handles on its top end.

* * * * *